(12) United States Patent
Yu

(10) Patent No.: US 6,580,392 B2
(45) Date of Patent: Jun. 17, 2003

(54) DIGITAL BEAMFORMING FOR PASSIVE DETECTION OF TARGET USING REFLECTED JAMMING ECHOES

(75) Inventor: Kai Bor Yu, Niskayuna, NY (US)

(73) Assignee: Lockheed Martin Corporation

( * ) Notice: Subject to any disclaimer, the term of this patent is extended or adjusted under 35 U.S.C. 154(b) by 0 days.

(21) Appl. No.: 09/949,170

(22) Filed: Sep. 7, 2001

(65) Prior Publication Data

US 2003/0071749 A1 Apr. 17, 2003

(51) Int. Cl.[7] .............................. G01S 3/02; G01S 3/78; G01S 3/80
(52) U.S. Cl. ................... 342/378; 342/17; 342/450; 342/453; 342/417; 367/119
(58) Field of Search ...................... 342/17, 378, 384, 342/417, 450, 453; 367/1, 119, 125

(56) References Cited

U.S. PATENT DOCUMENTS

| | | | | |
|---|---|---|---|---|
| 3,812,493 A | * | 5/1974 | Afendykiw et al. | 342/453 |
| 3,943,514 A | * | 3/1976 | Afendykiw et al. | 342/453 |
| 4,596,986 A | * | 6/1986 | Andrews et al. | 342/373 |
| 4,608,569 A | * | 8/1986 | Dickey, Jr. et al. | 342/384 |
| 4,746,924 A | * | 5/1988 | Lightfoot | 342/453 |
| 5,416,488 A | * | 5/1995 | Grover et al. | 342/159 |
| 6,297,765 B1 | * | 10/2001 | Frazier et al. | 342/133 |
| 6,424,290 B1 | * | 7/2002 | O'Neil et al. | 342/464 |

* cited by examiner

Primary Examiner—Ian J. Lobo
(74) Attorney, Agent, or Firm—Duane Morris LLP

(57) ABSTRACT

A radar system and method for detecting and tracking a target of interest in the presence of interference, wherein the interference emits interfering signals, includes a receiver for receiving the interfering signals directly from the interference. The receiver also receives reflected signals, wherein the reflected signals is the interfering signals reflected by the target of interest. The interfering signals and the reflected signals are compared to detect the target of interest. In one embodiment, the reflected signals and the interfering are cross-correlated. The results of the cross-correlation are used to obtain range, position, and velocity information about the target of interest from a range/Doppler map.

13 Claims, 4 Drawing Sheets

DIGITAL BEAMFORMING FOR PASSIVE DETECTION OF TARGET USING REFLECTED JAMMING ECHOES

FIELD OF THE INVENTION

This invention generally relates to a radar system and method for determining the location of a target and more specifically to a radar system and method for passively determining the location of a target using jammer echoes.

BACKGROUND

One problem facing surveillance and fire control radar systems today is target detection and estimation of target angle in the presence of severe jamming interference. Typically, jamming is in the form of a high power transmission designed to impair a radar system's performance. Jamming may comprise a signal modulated with noise or other disruptive information. The object of typical jammers is to impair the performance of a radar system's receiving electronics and/or obscure the display of potential targets of interest. The source of jamming interference may be mobile or may be relatively stationary (e.g., land based systems).

In an attempt to avoid detection by surveillance and tracking radar systems, low observable (LO) platforms, such as aircraft and ships, utilize an obscuring medium such as a coating that reduces the amplitude of signals reflected from the platform. From the perspective of the radar system, it becomes even more difficult to detect an LO target in the presence of jamming interference. To improve its ability to detect an LO target in the presence of jamming, a radar system may increase its transmission power in an attempt to receive a stronger return signal or echo (indicative of the reflected signals). However, it is advantageous, in some circumstances, for the radar system to remain covert (no transmission). Thus, there is a need for a radar system and method for covertly detecting and tracking a target of interest, such as an LO target, in the presence of jamming.

SUMMARY OF THE INVENTION

A radar system and method for detecting a target of interest in the presence of a source of interference, wherein the source of interference emits interfering signals, includes a receiver for receiving the interfering signals directly from the source of interference. The receiver also receives reflected signals, wherein the reflected signals are the interfering signals reflected by the target of interest. The interfering signals and the reflected signals are compared to detect the target of interest.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION

Figure 1:
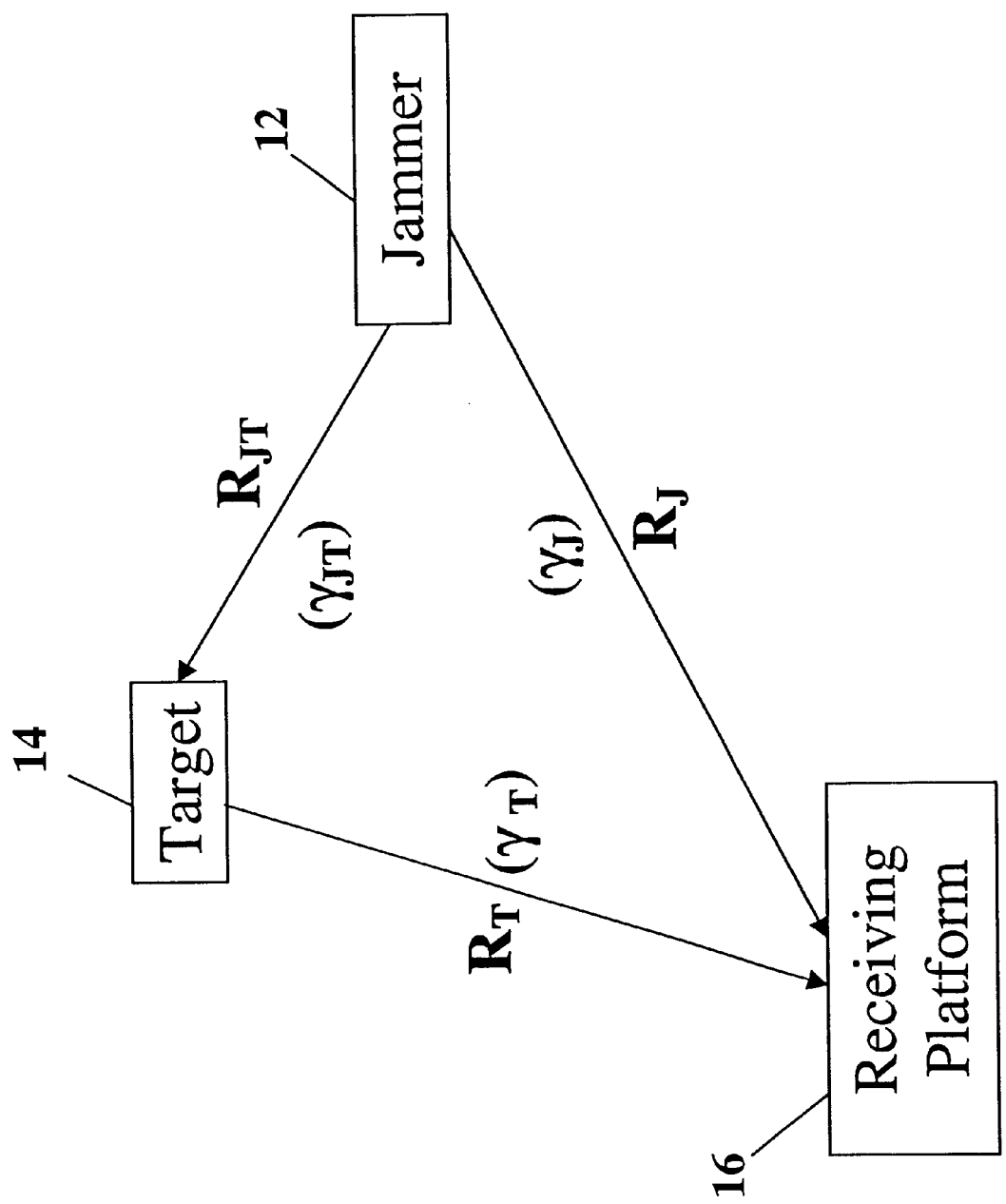
FIG. 1 is a block diagram of an exemplary radar system in accordance with the present invention.

FIG. 1 is a diagram depicting an exemplary configuration of a jamming interference 12, a target of interest 14, and a receiving platform 16, in accordance with an embodiment of the invention. The target 14 may be any target of interest, such as aircraft, missile(s), weather, marine vehicle(s), and/or land vehicle(s), for example. The receiving platform 16 may be any platform comprising a receiver having the ability to receive jammer signals and a processor for processing received signals. In an exemplary embodiment of the invention, receiving platform 16 is a radar system 400 (as will be described in more detail with respect to FIG. 4) comprising an antenna array 50 and a processor 52. Jammer 12 represents jamming interference. A single jammer is shown in FIG. 1 for explanatory purposes. However, a passive detection technique in accordance with the present invention is operable with a plurality of jammers positioned at various locations. Signals being transmitted by jammer 12 radiates outward in all directions from the jammer 12. A portion of the transmitted signals is received by the receiving platform 16 directly. The distance between jammer 12 to receiving platform 16 is designated $R_J$. The signals received by the receiving platform 16 directly from jammer 12 is designate $\gamma_J$. A portion of the radiated jammer signals propagates toward the target 14 and is then reflected toward the receiving platform 16. The portion of the radiated jammer signals that propagates toward the target 14 is designated $\gamma_{JT}$. The distance between target 14 and jammer 12 is designated $R_{JT}$. The signals that is reflected off of target 14 and directed toward receiving platform 16 is designated $\gamma_T$. The distance between target 14 and receiving platform 16 is designated $R_T$. Thus, the receiving platform 16 receives interfering signals transmitted by interference jammer 12 directly ($\gamma_J$) from the jammer 12 and indirectly in the form of reflected signals ($\gamma_T$), reflected off of the target of interest 14.

From the perspective of the receiving platform 16, portions of reflected signals $\gamma_T$ and interfering signals $\gamma_J$, having the same information content, will arrive at different times. That is, the reflected signals $\gamma_T$ is delayed in time with respect to the jammer signals $\gamma_J$. Thus, performing a cross-correlation function, with respect to time, on the reflected signals $\gamma_T$ and interfering signals $\gamma_J$ will result in a maximum value corresponding to the time difference of arrival to the receiving platform 16. The results of this cross-correlation function can be used to obtain kinematic information (e.g., location, range, velocity) pertaining to the target of interest 14.

Radar systems implementing antenna arrays typically form beam patterns comprising a central beam, i.e., main lobe, and surrounding minor lobes, i.e., sidelobes. Typically, it is desired to have a narrow mainlobe having high gain, and low sidelobes. To detect a desired target and reject unwanted clutter and jamming, the mainlobe is steered toward the target of interest. The desired target within the mainlobe is enhanced and the response to clutter and jamming outside the mainlobe is attenuated. Operationally, a plurality of beams, comprising a surveillance beam (search beam) and a reference beam, is used to detect and/or track a target of interest in the presence of jamming interference. The search beam sweeps across space, while the reference beam remains steered toward the jamming interference. The search beam and the reference beam are cross-correlated.

The results of the cross-correlation process are used to estimate the range and/or velocity of the target of interest from a corresponding range/Doppler map.

Figure 2:
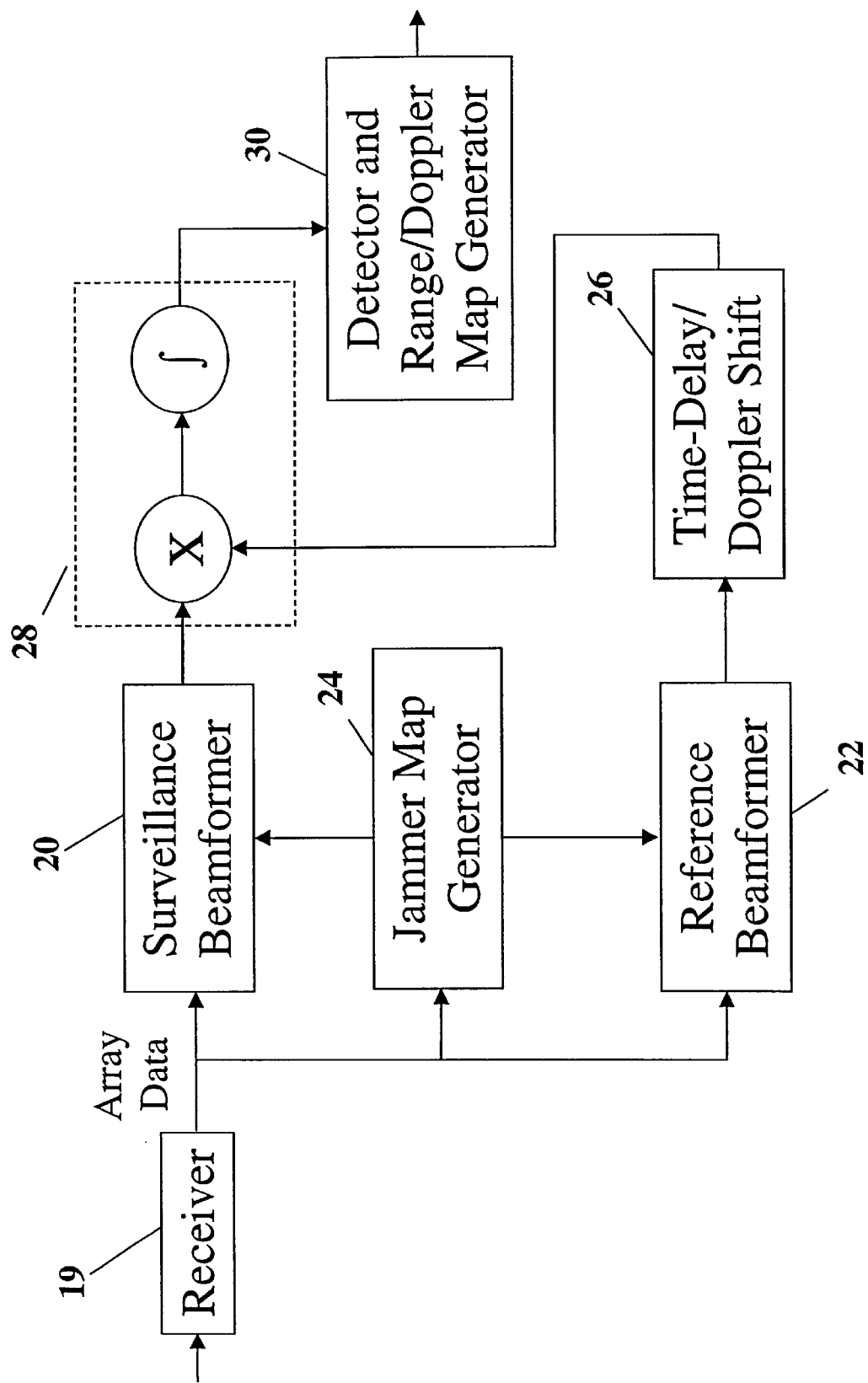
FIG. 2 is a functional block diagram of an exemplary digital beamforming system for passive detection of a target using reflected jamming echoes in accordance with an embodiment of the present invention.

FIG. 2 is a functional block diagram of an exemplary digital beamforming system 200 for passive detection of a target using reflected jamming echoes in accordance with an embodiment of the present invention. Signals are received by receiver 19. The receiver 19 may comprise an antenna array and associated electronics. The receiver 19 provides antenna array data to the surveillance beamformer 20, the jammer map generator 24, and the reference beamformer 22.

Surveillance (search) beamformer 20 processes the array data to form a beam pattern comprising a main lobe and sidelobes from the antenna array element data. The mainlobe of the beam pattern formed by surveillance beamformer 20 is steered to search for a target of interest 14. A reference beam pattern comprising a mainlobe and sidelobes is formed by reference beamformer 22. The mainlobe of the beam pattern formed by reference beamformer 22 is steered toward the jamming interference 12.

Search beams and reference beams may be formed in accordance with techniques comprising the appropriate resolution capabilities. Examples of techniques having the appropriate resolution capabilities include angle estimation techniques such as monopulse processing techniques and high-resolution techniques such as ESPRIT. Monopulse processing is described in U.S. Pat. No. 6,087,974, issued to Yu, which is hereby incorporated by reference in its entirety. In summary, monopulse processing is a radar processing technique in which the angular location of a target (also referred to as direction of arrival) can be determined within fractions of a beamwidth by comparing measurements received from two or more simultaneous beams. Two beams are formed upon reception for angle measurement. Monopulse processing may be implemented for linear arrays and for planar arrays.

ESPRIT is described in U.S. Pat. No. 6,225,948, issued to Baier, et al., which is hereby incorporated by reference in its entirety. In summary, ESPRIT is an estimation method for determining the directions of arrival of various signals. ESPRIT is an acronym for "Estimation of Signal Parameters via Rotational Invariance Techniques." ESPRIT uses an array of sensor pairs to perform signal reception for source parameter estimation for planar wavefronts. The method can yield simultaneous signal parameter estimates, such as temporal frequency and spatial angle estimation.

A jammer map is generated by the jammer map generator 24. A jammer map is a map comprising in formation about the angular location of the jammer. A jammer map may be formed in accordance with information provided by receiver 19 and/or also by information provided by other processors such as electronic support measures (ESM) equipment (ESM equipment not shown in FIG. 2). In contrast to the jammer map, the range/Doppler map generated by detector and range/Doppler map generator 30, comprises range and Doppler information pertaining to the target, and is obtained from the received signals resulting from the space search by the surveillance beam. Range to a target of interest may be estimated by analyzing the relative time delay between the received reflected signal, $\gamma_T$, and the received direct jammer signal, $\gamma_J$. The velocity of a target of interest may be estimated by analyzing the relative difference in frequency, due to the Doppler effect, between the received reflected signal, $\gamma_T$, and the received direct jammer signal, $\gamma_J$. Techniques for generating range/Doppler maps are well known in the art. The generation of the range/Doppler map by range/Doppler map is generator 24 may be by any appropriate technique. One technique for generating range/Doppler maps, for example, is described in a text entitled, "Synthetic Aperture Radar Processing", by Giorgio Franceschetti and Riccardo Lanari, CRC press, ISBN 0849378990, 1999, pgs. 138–141.

The reference beam information is time delayed (for range estimation) and/or Doppler shifted (for frequency and velocity estimation) by the time-delay/Doppler shifter 26. Correlator 28 compares the surveillance beam information and the time-delayed and/or frequency-shifted reference beam information to determine a degree of similarity between the two beams. The surveillance beam information and the delayed/shifted reference beam information are multiplied and integrated by the correlator 28. The results of the comparison process are used to generate the range/Doppler map information to determine kinematic information (e.g., range, location, velocity) about the target of interest. The reference beam information and the surveillance beam information may be compared by other techniques. The comparison process may comprise any appropriate comparison process, such as a data point to data point comparison, and/or a cross-correlation process. Also, the cross-correlation process may comprise applying windowing, or tapering, functions (windowing and tapering functions are well know in the art) to the reference beam data or the surveillance beam data, or both. Further, to increase the probability of detection, the comparison process may comprise squaring or cubing each data bin of the reference beam data or the surveillance beam data, or both. In an exemplary embodiment of the invention, correlator 28 is a cross correlator for cross-correlating the surveillance beam information with time-delayed and/or frequency-shifted reference beam information. The decision as to which beam of information to delay and/or frequency is a design choice. Thus in an alternate embodiment of the invention, the surveillance beam is time-delayed and/or frequency shifted instead of the reference beam.

Detector and range/Doppler map 30 analyzes the results of the comparison between the surveillance beam information and the reference beam information to obtain kinematic information (e.g., location, range, velocity) of the target of interest. In an exemplary embodiment of the invention, detector and range/Doppler map 30 detect a maximum value of the results of the cross correlation processes. The range and Doppler information associated with the time delay and/or frequency shift at the maximum value is used to determine range, location, and velocity of the target of interest. In another exemplary embodiment of the invention, the results of the correlation process are threshold detected, wherein a result having a value equal to or greater than a predetermined is determined to be a target of interest.

A brief mathematical treatment of an exemplary embodiment of the invention follows. Let r(t) be the array data received by the antenna array 52 (see FIG. 4). The array data, r(t), may be calculated in accordance with the following equation.

$$r(t) = a_J \begin{bmatrix} e^{j\frac{2\pi T_J x_1}{\lambda}} \\ e^{j\frac{2\pi T_J x_2}{\lambda}} \\ \vdots \\ e^{j\frac{2\pi T_J x_N}{\lambda}} \end{bmatrix} J(t) + a_T \begin{bmatrix} e^{j\frac{2\pi T_S x_1}{\lambda}} \\ e^{j\frac{2\pi T_S x_2}{\lambda}} \\ \vdots \\ e^{j\frac{2\pi T_S x_N}{\lambda}} \end{bmatrix} J(t-\tau)e^{j2\pi f_d(t-\tau)} + n(t), \quad (1)$$

where r(t) is the array data; $X_1 \ldots X_N$ are N-dimensional (e.g., two-dimensional) coordinates of each antenna array element, J(t) is the complex amplitude of the received jamming signal, received directly from the jammer; n(t) is received noise; $f_D$ is the received Doppler shift due to motion of the target of interest; $a_T$ is the received reflected jamming signal reflected from the target of interest; $a_J$ is the received jamming signal direct from the jamming interference; $\tau$ is the time delay between the reflected signal and the direct signal; and $T_S$ and $T_J$ are two-dimensional target and jamming directional cosine vectors, respectively, wherein $T_S=[T_{S(X)}, T_{S(Y)}]$ and $T_J=[T_{J(X)}, T_{J(Y)}]$ calculated in accordance with the following equations.

$$T_{S(x)}=\cos(\beta_S)\sin(\theta_S), \quad (2)$$

$$T_{S(y)}=\sin(\theta_S), \quad (3)$$

$$T_{J(x)}=\cos(\beta_J)\sin(\theta_J), \text{ and} \quad (4)$$

$$T_{J(y)}=\sin(\theta_J), \quad (5)$$

where, $T_{S(x)}$ is the azimuth directional cosine for the reflected jammer signal, $T_{S(y)}$ is the elevation directional cosine for the reflected jammer signal, $\theta_S$ and $\beta_S$ are the steering angles, in azimuth and elevation, respectively, off boresight of the antenna array toward the search angle; $T_{J(x)}$ is the azimuth directional cosine for the direct jammer signal, $T_{J(y)}$ is the elevation directional cosine for the direct jammer signal, and $\theta_J$ and $\beta_J$ are the steering angles, in azimuth and elevation, respectively, off boresight of the antenna array toward the jammer.

The angle of arrival of the direct jamming signal may be determined using various techniques, such as ESPRIT or monopulse processing techniques, for example. In an exemplary embodiment of the invention, at least one null of the surveillance beam pattern is steered toward the jammer, and at least one null of the reference beam pattern (beam pattern having its mainlobe steered toward the jamming interference) is steered toward the surveillance steering angle. Nulls may be steered adaptively, as is well known in the art. Let $\underline{S}$ be the steering vector for the surveillance beam and let $\underline{J}$ be the steering vector for the reference beam. $\underline{S}$ and $\underline{J}$ can be modified such that at least one null of $\underline{S}$ is steered toward the jammer and at least one null of $\underline{J}$ is steered toward the surveillance steering angle in accordance with the following equations.

$$\hat{\underline{S}} = \frac{\underline{S} - \frac{\underline{J}^H \underline{S}}{\underline{J}^H \underline{J}}\underline{J}}{\left|\underline{S} - \frac{\underline{J}^H \underline{S}}{\underline{J}^H \underline{J}}\underline{J}\right|}, \text{ and} \quad (6)$$

$$\hat{\underline{J}} = \frac{\underline{J} - \frac{\underline{S}^H \underline{J}}{\underline{S}^H \underline{S}}\underline{S}}{\left|\underline{J} - \frac{\underline{S}^H \underline{J}}{\underline{S}^H \underline{S}}\underline{S}\right|}, \quad (7)$$

where +e,cirS+ee is the estimated steering vector for the surveillance beam, +e,cirJ+ee is the estimated steering vector for the reference beam, the superscript "H" indicates the complex conjugate transpose, $$\left|\underline{J} - \frac{\underline{S}^H \underline{J}}{\underline{S}^H \underline{S}}\underline{S}\right|$$

is the magnitude of $$\underline{J} - \frac{\underline{S}^H \underline{J}}{\underline{S}^H \underline{S}}\underline{S}, \text{ and } \left|\underline{S} - \frac{\underline{J}^H \underline{S}}{\underline{J}^H \underline{J}}\underline{J}\right|$$

is the magnitude of $$\underline{S} - \frac{\underline{J}^H \underline{S}}{\underline{J}^H \underline{J}}\underline{J}.$$

Thus, two beam patterns are formed, one (the reference beam) has its mainlobe steered toward the jammer and at least one null adaptively steered toward the surveillance angle (search direction), and the other beam pattern (the surveillance beam) has its mainlobe steered in the search direction and at least one of its nulls adaptively steered toward the jammer. Nulls may also be inserted into the low sidelobe weighting vectors for each of the reference and surveillance beams using phase-only nulling techniques as described in U.S. Pat. No. 5,515,060, issued to Hussain et al., which hereby incorporated by reference in its entirety. The two beams may be expressed in accordance with the following equations.

$$r_\Sigma(t)=g_\Sigma(\hat{T}_S-T_S)J(t-\tau)e^{j2\pi f_d(t-\tau)}+n_\Sigma(t), \text{ and} \quad (8)$$

$$r_d(t)=g_\Sigma(\hat{T}_S-T_J)J(t)+n_d(t), \quad (9)$$

where $r_\Sigma(t)$ is the received surveillance signal beam; $r_d(t)$ is the received reference signal beam; $g_\Sigma$ is the antenna pattern resulting from steering the surveillance beam toward the search direction; $n_\Sigma(t)$ is noise received at the antenna associated with the surveillance beam; $n_d(t)$ is noise received at the antenna associated with the reference beam; and $\hat{T}_S$ is the estimated target directional cosine steered toward the estimated angle of arrival of the target of interest.

The two beams, $r_\Sigma(t)$ and $r_d(t)$ are cross-correlated in accordance with the following equation.

$$y(\hat{\tau},\hat{f}_d)=\int r_\Sigma(t)r_d^*(t-\hat{\tau})e^{j2\pi \hat{f}_d(t-\hat{\tau})}dt, \quad (10)$$

where $\hat{\tau}$ is the estimated time delay between the reference signal and the reflected signal from the target of interest, $\hat{f}_d$ is the estimated Doppler shift due to the motion of the target of interest; and the superscript "*" indicates the complex conjugate.

Figure 3:
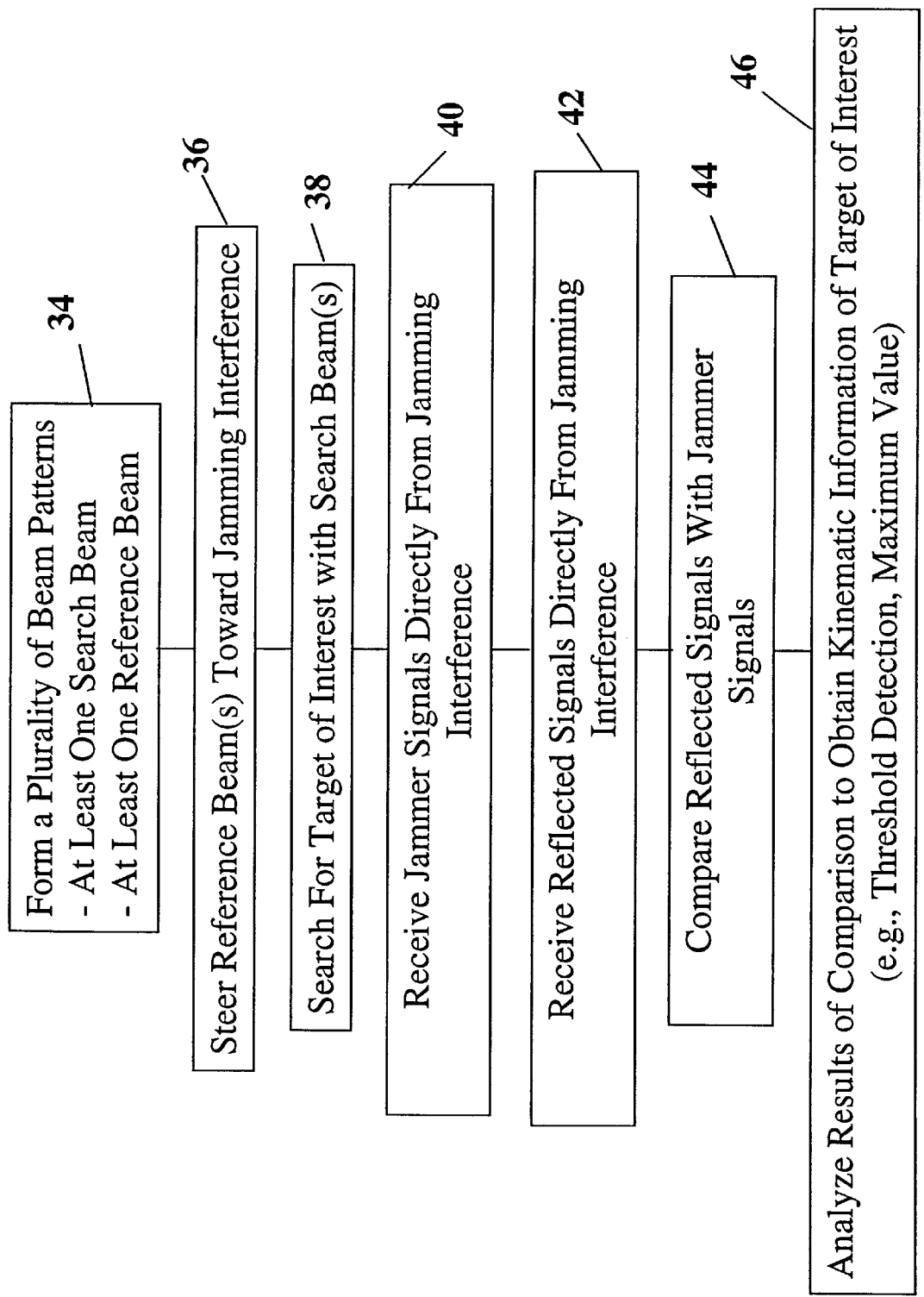
FIG. 3 is a flow diagram of an exemplary process for passive detecting a target of interest using reflected jammer echoes in accordance with an embodiment of the present invention.

FIG. 3 is a flow diagram of an exemplary process for passive detecting a target of interest using reflected jammer echoes in accordance with an embodiment of the present invention. A plurality of beams is formed in step 34. This plurality comprises at least one search beam (surveillance beam) and at least one reference beam. The search beam searches for a target(s) of interest (step 38) and the reference beam is steered toward the jamming interference (step 36). More than one search and/or reference beam may be formed. Signals emitted by the jammer interference is received via the reference beam (step 40) and reflected signals is received via the search beam (step 42). The reflected signals comprises jammer signals that is reflected off the target of interest. The reflected signals is compared with the interfering jammer signals in step 44. This comparison may comprise any appropriate comparison process, such as a data point to data point comparison, and/or a cross-correlation process. Also, the cross-correlation process may comprise applying windowing, or tapering, functions (windowing and tapering functions are well know in the art) to the reference beam data or the surveillance beam data, or both. Further, to increase the probability of detection, the comparison process may comprise squaring or cubing each data bin of the reference beam data or the surveillance beam data, or both. The results of the comparison process are analyzed and used to obtain kinematic information (e.g., position, velocity, range) about the target of interest from the range/Doppler map.

Figure 4:
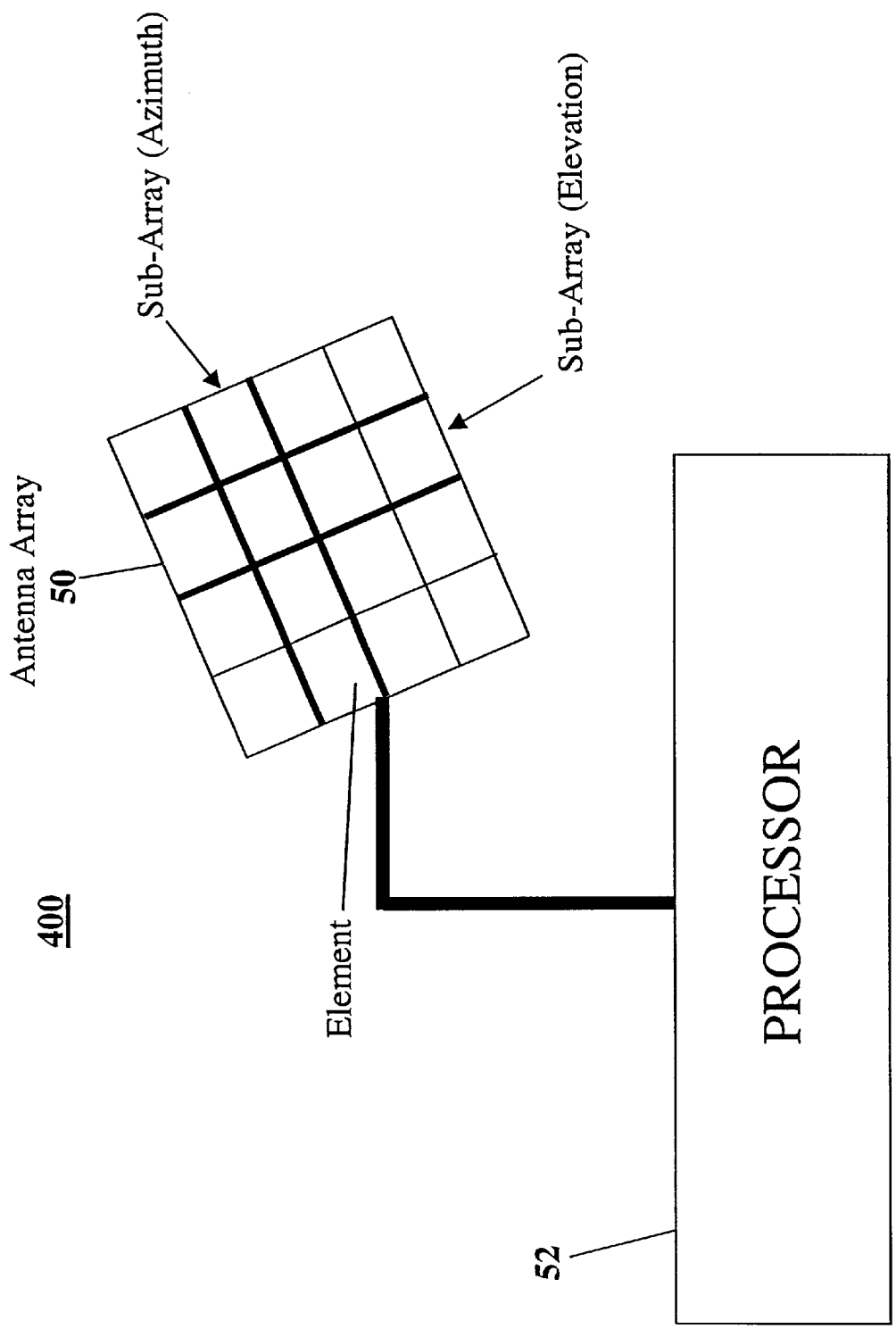
FIG. 4 is a block diagram of a radar system comprising an antenna array and computer processor in accordance with an exemplary embodiment of the invention.

The present invention may be embodied in the form of computer-implemented processes and apparatus for practicing those processes. FIG. 4 is a block diagram of a radar system comprising an antenna array 50 and computer processor 52 in accordance with an exemplary embodiment of the invention. Computer processor 52 performs processes for digitally beamforming and passively detecting a target using reflected jamming echoes in accordance with the present invention, as herein described. Received signal processing may also be performed by special purpose hardware.

The present invention may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by computer processor 52, the computer processor 52 becomes an apparatus for practicing the invention. The present invention may also be embodied in the form of computer program code, for example, whether stored in a storage medium, loaded into and/or executed by computer processor 32, or transmitted over some transmission medium, such as over electrical wiring or cabling, through fiber optics, or via electromagnetic radiation, wherein, when the computer program code is loaded into and executed by computer processor 52, the computer processor 52 becomes an apparatus for practicing the invention. When implemented on a general-purpose processor, the computer program code segments configure the processor to create specific logic circuits.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A method for passively detecting a target in the presence of a source of interference signals, said method comprising the steps of:

forming a plurality of beam patterns comprising at least one search beam and at least one reference beam, each of said beam patterns comprising at least one null;

searching for said target with said at least one search beam, while maintaing said at least one null of said search beam steered toward said source of interference signals;

steering said at least one reference beam toward said source of interference signal, while maintaining said at least one null of said reference beam steered toward a direction of search;

receiving said interfering signals directly from said interference;

receiving reflected signals, wherein said reflected signals represent said interfering signals reflected by said target; and comparing said interfering signals with said reflected signals to detect said target.

2. A method in accordance with claim 1, wherein said step of comparing comprises cross correlating said reflected signals with said interference signals.

3. A system for passively detecting a target in the presence of a source of interference signals, said system comprising:

a surveillance beamformer for forming at least one surveillance beam including a null and a non-null portion, and for searching for said target with said non-null portion of said at least one surveillance beam while maintaining said null steered toward said source of interference;

a reference beamformer for forming at least one reference beam including a null and a non-null portion, and steering said non-null portion of said at least one reference beam toward said interference and said null of said at least one reference beam toward a search direction;

a receiver for receiving said interfering signals directly from said interference by way of said reference beamformer and for receiving reflected signals by way of said surveillance beamformer, wherein said reflected signals represent said interfering signals reflected by said target; and a correlator for determining a degree of similarity between said reflected signals and said interfering signals.

4. A method in accordance with claim 3, further comprising the step of determining kinematic information of said target in accordance with a maximum cross-correlation value and a corresponding range/Doppler map of space searched by said search beam.

5. A system in accordance with claim 3, wherein said system is a radar system.

6. A system in accordance with claim 3, further comprising a range/Doppler map generator for generating a range/Doppler map of space search by said surveillance beam, wherein said correlator cross-correlates said reflected signals with said interference signals and kinematic information of said target is determined in accordance with a maximum cross-correlation value and said range/Doppler map.

7. A system in accordance with claim 3, wherein said system detects and tracks said target.

8. A system according to claim 3, wherein said non-null porton is a peak portion.

9. A computer readable medium having embodied thereon a computer program for passively detecting a radar target in the presence of a source of interference, the computer readable program comprising:

means for causing said computer to form a plurality of beam patterns comprising at least one search beam and at least one reference beam, where each search beam comprises at least one null steered toward said interference, each reference beam comprises at least one null steered toward a direction of search, each search beam comprises at least one non-null portion, and each reference beam comprises at least one non-null portion;

means for causing said computer to search for said target with said non-null portion of said at least one search beam;

means for causing said computer to steer said non-null portion of said at least one reference beam toward said source of interference;

means for causing said computer to receive said interference signals directly from said source of interference by means of said reference beam;

means for causing said computer to receive reflected signals by way of said search beam, wherein said reflected signals represent said interfering signals reflected by said target; and means for causing said computer to compare said interfering signals with said reflected signals to detect said target.

10. A computer readable medium in accordance with claim 9, wherein said means for causing said computer to compare said interfering signals with said reflected signals comprises means for causing said computer to cross correlate said reflected signals with said interference signals.

11. A computer readable medium in accordance with claim 10, wherein said computer program further comprises means for causing said computer to determine kinematic information of said target in accordance with a maximum cross-correlation value and a corresponding range/Doppler map of space searched by said search beam.

12. A computer readable medium in accordance with claim 9, wherein said computer program further comprising means for causing said computer to track said target.

13. A computer readable medium in accordance with claim 9, wherein said non-null portion is a peak portion.

* * * * *